US008715063B2

(12) United States Patent
White

(10) Patent No.: US 8,715,063 B2
(45) Date of Patent: May 6, 2014

(54) METHOD AND APPARATUS FOR A WAGERING GAME HAVING A SECONDARY GAME FOR MODIFYING A PRIMARY GAME

(75) Inventor: Michael L. White, Glenview, IL (US)

(73) Assignee: Primo Innovo, LLC, Glenview, IL (US)

( * ) Notice: Subject to any disclaimer, the term of this patent is extended or adjusted under 35 U.S.C. 154(b) by 1441 days.

(21) Appl. No.: 11/974,616

(22) Filed: Oct. 15, 2007

(65) Prior Publication Data

US 2013/0137517 A1 May 30, 2013

(51) Int. Cl.
*A63F 13/10* (2006.01)
*G07F 17/32* (2006.01)

(52) U.S. Cl.
USPC .................... 463/25; 463/12; 463/13; 463/16

(58) Field of Classification Search
CPC .................................................. G07F 17/3267
USPC ......................................... 463/12, 13, 25, 16
See application file for complete search history.

(56) References Cited

U.S. PATENT DOCUMENTS

| | | | | |
|---|---|---|---|---|
| 4,836,553 | A * | 6/1989 | Suttle et al. | 273/292 |
| 5,174,579 | A | 12/1992 | Griffiths | |
| 5,660,392 | A | 8/1997 | Hansen | |
| 5,673,917 | A | 10/1997 | Vancura | |
| 5,820,460 | A | 10/1998 | Fulton | |
| 6,062,564 | A | 5/2000 | Terminel | |
| 6,095,525 | A | 8/2000 | Termined | |
| 6,311,978 | B1 | 11/2001 | Moody | |
| 6,394,456 | B1 | 5/2002 | Long | |
| 6,416,408 | B2 | 7/2002 | Tracy | |
| 6,450,500 | B1 | 9/2002 | Miller | |
| 6,585,588 | B2 | 7/2003 | Hartl | |
| 6,692,003 | B2 | 2/2004 | Potter | |
| 6,790,141 | B2 * | 9/2004 | Muir | 463/42 |
| 6,802,774 | B1 * | 10/2004 | Carlson et al. | 463/16 |
| 6,808,173 | B2 | 10/2004 | Snow | |
| 7,097,175 | B2 | 8/2006 | Centrone | |
| 7,222,854 | B2 | 5/2007 | Sorge | |
| 7,247,093 | B2 * | 7/2007 | Rothkranz | 463/16 |
| 7,326,115 | B2 | 2/2008 | Baerlocher | |
| 7,419,162 | B2 | 9/2008 | Lancaster | |
| 7,690,976 | B2 * | 4/2010 | Edidin et al. | 463/13 |
| 2005/0054412 | A1 | 3/2005 | Gauselmann | |
| 2005/0277457 | A1 * | 12/2005 | Wilson | 463/12 |
| 2007/0021174 | A1 * | 1/2007 | Duhamel | 463/16 |
| 2007/0155477 | A1 * | 7/2007 | Gevisser | 463/20 |
| 2007/0167208 | A1 * | 7/2007 | Acres | 463/16 |
| 2008/0252011 | A1 * | 10/2008 | Bickley et al. | 273/292 |

* cited by examiner

*Primary Examiner* — Dmitry Suhol
*Assistant Examiner* — Jay Trent Liddle
(74) *Attorney, Agent, or Firm* — Michael L. White

(57) ABSTRACT

A wagering game having a primary game and a secondary game. In one embodiment, an intermediate game outcome for the primary game is first determined. The intermediate game outcome provides the player with an indication of the probability of receiving a winning primary game outcome. The player may then use this indication for determining whether to play the secondary game. The optional secondary game, if won, modifies the play of the primary game to the advantage of the player. Consequently, the intermediate game outcome is resolved to determine the primary game outcome in accordance with the modified primary game. If the secondary game outcome is lost, the immediate game outcome is resolved to determine the primary game outcome without modifying the primary game.

6 Claims, 9 Drawing Sheets

METHOD AND APPARATUS FOR A WAGERING GAME HAVING A SECONDARY GAME FOR MODIFYING A PRIMARY GAME

FIELD OF THE INVENTION

This invention relates to gaming, and more particularly, in one embodiment, to wagering games played on video gaming machines.

BACKGROUND OF THE INVENTION

Gaming machines are a popular form of entertainment with gaming establishment patrons. In some gaming establishments, gaming machines produce greater revenue than table games. Variations of familiar table games, such as Blackjack and Poker, are now available on video gaming machines for play by individuals and groups of players.

SUMMARY OF THE INVENTION

A wagering game having a primary game and an optional secondary game may, in one embodiment, be implemented on a video gaming machine. In this embodiment, an intermediate game outcome for the primary game is first determined. This intermediate game outcome provides the player with an indication of the probability of receiving a winning primary game outcome. The player may then use the probabilistic indication as a basis for determining whether to play the optional secondary game. The optional secondary game, if won, modifies the play of the primary game. In one embodiment, the play of the primary game is modified (e.g., changes in rules, game play, etc.) to provide an advantage and/or benefit to the player not originally available in the primary game.

BRIEF DESCRIPTION OF THE FIGURES

Various embodiments of the wagering game are described and illustrated in the accompanying figures. The figures are provided as examples only and are not intended to be considered as limitations to the invention. Similarly, numerical entries only represent exemplary information, and those skilled in the art understand that a variety of different values and alternate arrangements can be made. Consequently, the wagering game is illustrated by way of example and not by limitation in the accompanying figures in which.

DETAILED DESCRIPTION

The wagering game described in the following embodiments may be adapted for play on gaming machines similar to those commonly found in gaming establishments. Gaming establishments commonly network these gaming machines into a gaming system that facilitates the monitoring of each gaming machine in the system.

Figure 1:
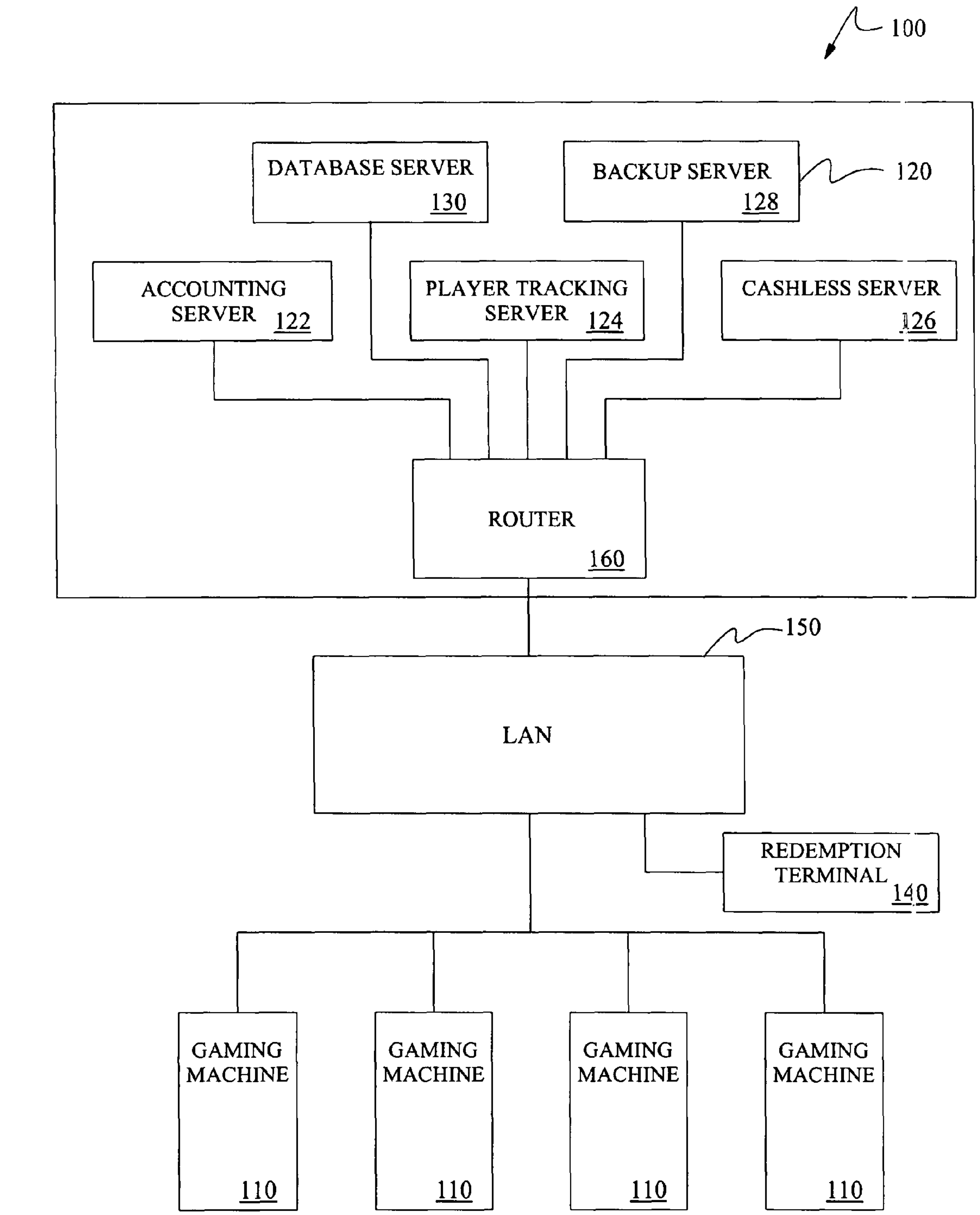
FIG. 1 is an exemplary block diagram of a gaming system.

Referring to FIG. 1, a gaming system 100 typically found in a gaming establishment is illustrated. Gaming machines 110 on the floor of a gaming establishment are usually in communication with a number of servers 120 that provide ancillary support services for wagering activity at each gaming machine. These servers 120, and the gaming machines 110 they communicate with, are connected in a communications network (e.g., a local area network (LAN) 150) linking the gaming system 100 together. Other network devices such as routers 160, storage devices (e.g., a database server 130), and backup servers 128 may also be part of the gaming system 100. Although it is common practice to use several different servers, each dedicated to particular gaming functions, it is also possible to bundle these different gaming functions for execution on a single server.

Servers 120 commonly found in some gaming systems include: an accounting server 122 to record wagers and payouts, a player-tracking server 124 to track wagering activity of individual players, and a cashless server 126 to assist with the issue and redemption of wagering vouchers.

Vouchers are typically paper tickets with an imprinted monetary value that facilitates wagering. These vouchers are accepted and printed by gaming machines 110 to allow players to make wagers and cash out of the gaming machine. Each wagering voucher has a unique barcode identifier associated with a specific monetary value. The barcode identifier is communicated to the cashless server 126 from the gaming machine 110. The cashless server 126 stores this information for later recall when the voucher is presented for redemption. When presented for redemption, the barcode information is communicated to the cashless server 126, the voucher is validated by the cashless server, the voucher value communicated to the gaming machine 110, and the value of the voucher credited for play on the gaming machine.

Other gaming devices in the gaming system 100 may be present and in communication with the communication network 150. For example, a redemption terminal 140, (e.g., such as a computer terminal for a cashier or a self serve kiosk) may be available to allow a player to cash out a voucher. This redemption terminal 140 is typically in communication with the cashless server 126 to facilitate monetary transactions.

The gaming machines 110, servers 120, and other network devices typically use serial communication protocols for transferring data over the gaming system communication network 150. In other embodiments, gaming systems 100 may use Ethernet type communication protocols—or any other communication protocol using any number of different types of communication media (including, e.g., optical fiber, radiofrequency, etc).

Regardless of whether or not a single or multiple servers 120 are utilized in the gaming system 100 embodiment illustrated in FIG. 1, the gaming machine 110 determines the game outcome and the servers (or server) 120 support(s) the wagering and data collection activities for each gaming machine in the gaming system. A game program (i.e., software) that controls the gaming machine 110 is executed with a CPU in the gaming machine.

In other gaming systems, in lieu of executing a game program from a CPU in the gaming machine, the execution of the game program is performed by a CPU in a game server (not shown) used in some gaming system embodiments.

For example, in one embodiment, the game server may execute a game program in response to initiation of the wagering game at a gaming machine 110. In this gaming system embodiment, the game server may perform all game program calculations and simply transmit video data to the gaming machine for display. Player selections may be transmitted from the gaming machine to the game server for further execution by the game program running on the game server.

Alternatively, in still another gaming system embodiment, a CPU in the gaming machine and a CPU in a game server may each execute portions of a game program. For example, the game server may be limited to determining and transmitting random numbers to the gaming machine. These random numbers are used by the gaming machine to determine, either directly or indirectly, game outcomes.

The gaming machine 110 illustrated in FIG. 1 is typically either an electro-mechanical gaming machine or a video gaming machine. The electro-mechanical gaming machine has mechanical reels that display game outcomes. In contrast, the video gaming machine has a video display for displaying game outcomes. With the exception of the game presentation (i.e., either mechanical reels or a video display), both types of gaming machines generally operate using the same basic principles.

Video gaming machines, because of their video display, are easily adaptable to support many different types of wagering games. Because of their flexibility, video gaming machines can offer not only slot-type games; but also card games such as Poker and Blackjack. The wagering game described herein may be adapted for play on either video or electro-mechanical gaming machines.

Figure 2:
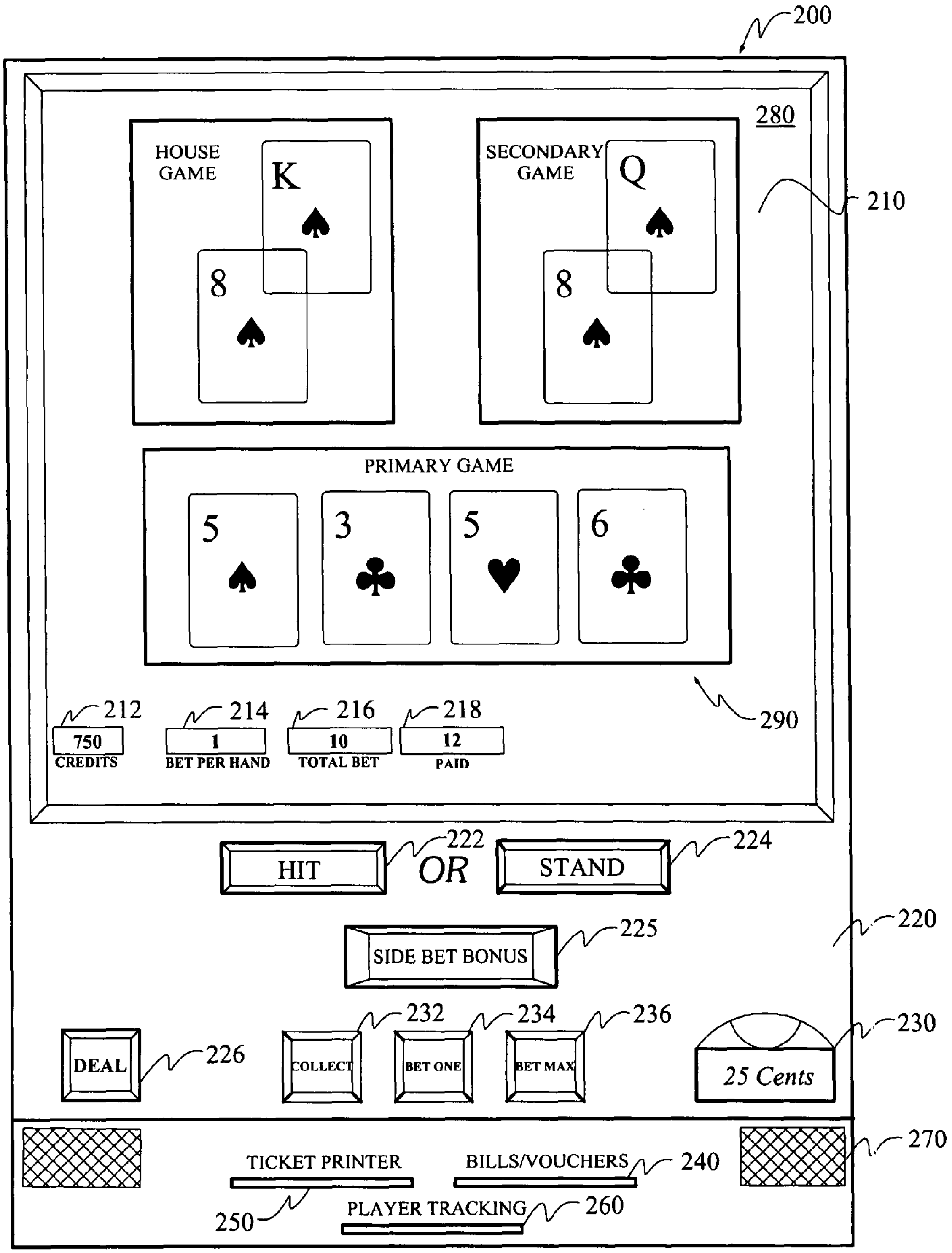
FIG. 2 is an orthogonal view of one embodiment of the gaming machine illustrated in FIG. 1.

FIG. 2 illustrates one embodiment of a video gaming machine 200 specifically adapted for play of the wagering game embodiments described herein. The video gaming machine 200 has a wager acceptor for initiating game play. The wager acceptor may be a bill validator 240 (for accepting paper currency), a coin acceptor 230, or any other device capable of receiving and registering some form of acceptable monetary value. The bill validator 240 may, in some embodiments, also accept vouchers (generally in the form of paper tickets).

As discussed above, vouchers are printed by some video gaming machines 200 in lieu of paying coins when a player cashes out of the gaming machine. The video gaming machine 200, in this embodiment, has a ticket printer 250 which prints a voucher for the value of the cash out from the gaming machine. Typically, the voucher may be redeemed by a video gaming, machine 200 by inserting the voucher into the bill validator 240. The bill validator 240 reads the barcode printed on the voucher and credits the video gaming machine 200 for the value of the voucher.

The video gaming machine 200, in some embodiments, may have an alternative or additional payout mechanism such as a coin hopper (not shown on FIG. 2) internal to the gaming machine. The coin hopper dispenses coins to the player when the player cashes out.

The video gaming machine 200 may also include a card reader 260 for reading an identification card commonly known as a player-tracking card. The player-tracking card is commonly provided to gaming patrons for participation in player loyalty programs sponsored by the gaming establishment. The player-tracking card is encoded with a unique player identification number. The card reader 260 reads the player-tracking card and communicates the player's identification number to a player-tracking server. The player-tracking server maintains a record of the player's wagering activity, allowing the gaming establishment to reward gaming patrons commensurate with their wagering activity.

Game play is initiated when the video gaming machine 200 receives a wager. The wagering game 290, in one embodiment, is displayed on the video display 210 of the video gaming machine 200. The video display 210 is generally a CRT or flat-panel display such as a LCD, LED, or plasma display. However, any other type of display may be used to present the wagering game 290.

The video display 210 may also have a video representation of meters to provide wagering information to the player. The meter display may include: a credit meter 212 (displays total credits available for wagering), bet per game meter 214 (displays the number of credits bet on each game), a total bet meter 216 (displays the total wagered amount), and a paid credit meter 218 (displays payoff credits obtained from a winning game outcome).

The video display 210 may operate, in some embodiments, in conjunction with a touch screen 280. Icons representing various potential player selections may be presented on the video display 210. The player may touch the desired icon presented on the video display 210 to implement the corresponding function represented by the icon.

In addition to using a touch screen 280, the player may also make selections, in some embodiments, using a pushbutton panel 220. The pushbutton panel 220 may allow the player to make game play and wagering selections. For example, the player may designate: the amount wagered on each individual game (e.g., the bet one pushbutton 234 and the bet max pushbutton 236), when to start the game (e.g., the deal pushbutton 226), and the collection of remaining credits on the gaming machine (e.g., using the collect pushbutton 232). The pushbutton panel may also be used by the player to make game play decisions. For example, in Black Jack type games, the pushbutton panel may be used to receive additional cards (e.g., the "hit" pushbutton 222) or signal a completed card hand (e.g., "stand" pushbutton 224). In Poker type games, pushbuttons may be available to receive additional cards, discard cards, and to indicate a completed card hand.

To facilitate the play of a plurality of different games on a single video gaming machine 200, the touch screen 280 may serve as a means for inputting player selections. If desired, in one embodiment the touch screen 280 may be used exclusively to control game play—eliminating the need for a pushbutton panel 220. In other embodiments, a combination of the pushbutton panel 220 and the touch screen 280 may be used to execute the player's game play decisions.

In addition, the video gaming machine 200 may provide sound effects or music to accompany game play through speakers 270. The speakers 270 may also provide game play information (e.g., audio help to the player).

Figure 3:
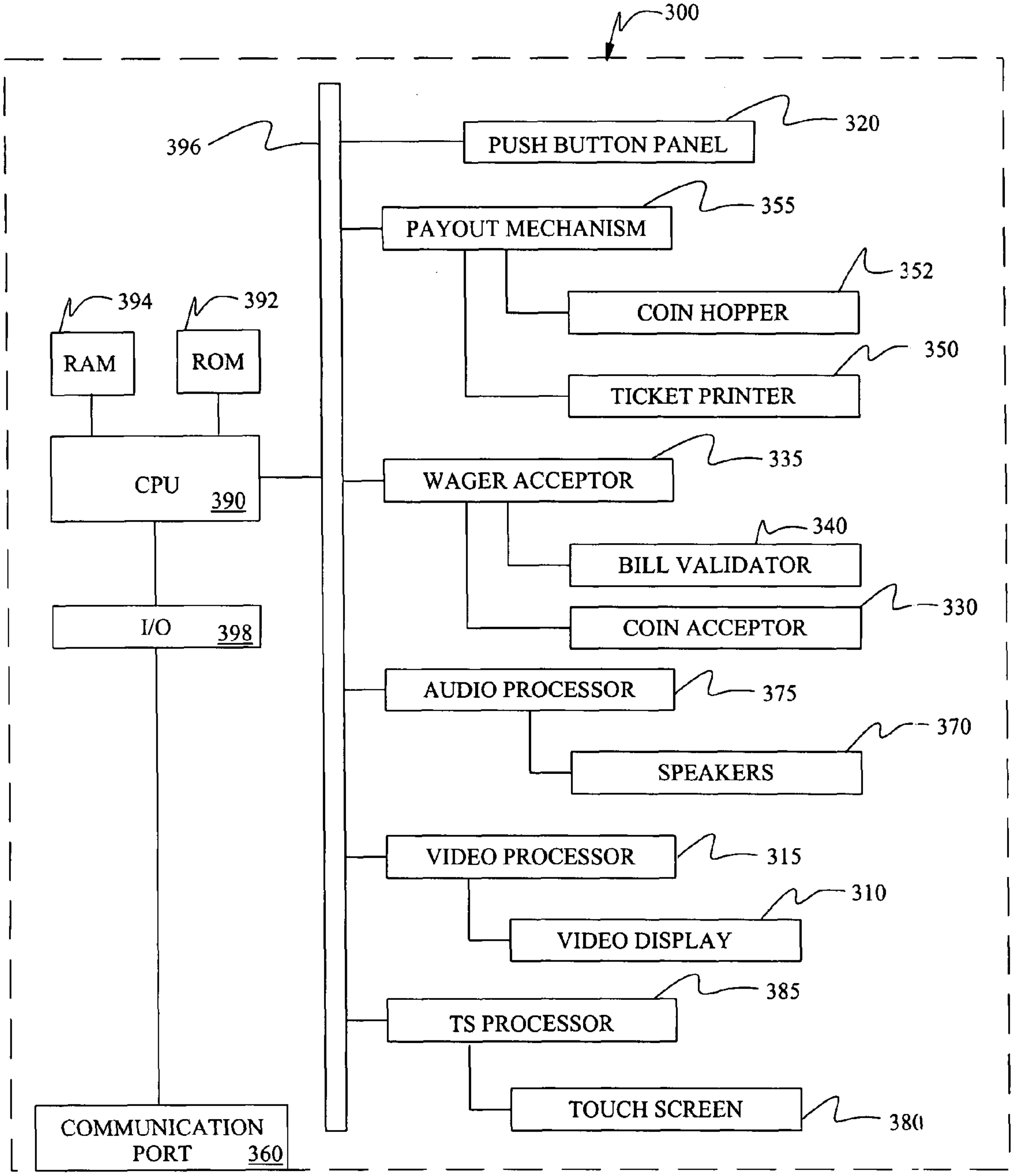
FIG. 3 is an exemplary block diagram of one embodiment of the control system of the gaming machine of FIG. 2.

With reference to FIG. 3, an exemplary control block diagram 300 is provided depicting the operational control of one embodiment of the video gaming machine 200 illustrated in FIG. 2. The central processing unit (i.e., CPU) 390, among other functions, controls the operation of peripheral devices ancillary to the operation of the gaming machine through the execution of the game program.

The CPU 390 has an I/O bus 396 to control communications between the CPU and each of the peripheral devices. The peripheral devices controlled, either directly or indirectly, by CPU 390 include: the bill validator 340 and coin acceptor 330 (more generally known as wager acceptors 335), the video display 310 (output controlled by video processor 315), the pushbutton panel 320, the coin hopper 352 and ticket printer 350 (more generally known as payout mechanism 355), speakers 370 (output controlled by audio processor 375), and the touch screen 380 (input monitored by touch screen processor 385).

In addition to controlling each of the gaming machine's peripheral devices, the CPU 390, through the execution of the game program, also controls game play. The gaming machine has both non-volatile read-only memory (ROM) 392 in which the game program is stored and volatile random access memory (RAM) 394 from which the game program is executed by the CPU 390.

The game play displayed by the typical gaming machine is at least partially determined by the CPU. For a card type wagering game, in one embodiment, the CPU 390 randomly selects indicia from an indicia set by generating a random number with a random number generator (not shown). In one embodiment, the random number generator (RNG) employs a mathematical formula to determine a random number. The random number determined is within a predetermined numerical range and corresponds, in one embodiment, to one of the indicia in the indicia set; e.g., an Ace from a virtual card deck. In this embodiment, with the selection of sufficient random numbers, a random card hand may be formed.

In the case of a slot-type game, the random number determined is within a predetermined numerical range and corresponds to a game outcome listed in a probability table stored in memory. The probability table determines the probability of occurrence of any game outcome by associating each of the random numbers in a given range with a game outcome. The probability table is usually weighted to achieve a desired game outcome distribution over a large number of game outcomes. Consequently, some slot-type game outcomes will be associated with more random numbers than other game outcomes. This is in contrast with card type games which may utilize a standard 52 card deck, wherein each card has an equal probability of being randomly selected.

The random selection of indicia is displayed to the player. More specifically, the CPU 390 in the video gaming machine signals the video processor 315 to display the game outcome on the video display 310.

The CPU 390 not only controls and communicates with peripheral devices inside the gaming machine, but is also in communication with various servers that provide ancillary support services through a communication network as previously discussed. Typically, the CPU 390 has a second I/O 398 that exchanges data with the communication network through communication port 360 in the gaming machine.

With a general understanding of gaming machine operation, the wagering game executed by the game program is described in further detail. In one embodiment, the wagering game may be broadly described as a primary game with a selectively available secondary game. The secondary game becomes available after an intermediate game outcome for the primary game is displayed to the player. After the secondary game outcome is determined, play of the primary game is resumed with the intermediate game outcome resolved to determine the primary game outcome.

The intermediate game outcome provides the player with an indication of potential success in the primary game. This indication, in some embodiments, is in the form of a probability for receiving a winning primary game outcome; as determined either by the player in one embodiment, or directly communicated to the player by the gaming machine. The appeal of the secondary game, in one embodiment, is its potential for modifying the play of the primary game to benefit and/or provide an advantage to the player.

The modification in the primary game may be broadly defined, in one embodiment, as changing the expected payback percentage of the primary game, or more broadly, in another embodiment, as changing the payback percentage of the wagering game as a whole. The expected payback percentage (also known as expected value) of a wagering game is the percentage of the player's wager returned to the player averaged over extremely large number of game outcomes (assuming perfect play of the game).

For video Poker type games the payback percentage is typically around 95%. This means that for each time the player wagers a dollar, the player—on average—will receive back 95 cents. However, dependent upon the regulatory jurisdiction, the payback percentage may vary from about 80% to 100%. Gaming establishments with gaming machines having a 100% payback percentage rely on players not to play perfectly to earn a profit on these gaming machines.

The expected payback percentage can be modified by changing the primary game rules to either or both: 1) change the probability of obtaining a winning primary game outcome, or 2) change the pay table for a winning primary game outcome.

In some embodiments, the expected payback percentage of the primary game may also be changed through the implementation of new or different rules governing the play of the game (i.e., game play mechanics), instead of changing the wagering game's pay table or probability table. For example, rules governing wagering on the primary game may affect the expected payback percentage of the primary game without affecting the probability or pay table.

In a game of Blackjack, for example, one of the traditional wagering game play mechanics is the double down feature. This feature allows a player to double an initial wager and receive one additional card to complete the hand. Consequently, this game play mechanic changes the expected payback percentage of the primary game without altering the pay table or probability table of the Blackjack game.

The secondary game may have any desired payback percentage. In one embodiment, the secondary game may have a smaller payback percentage than the primary game. This allows the secondary game to help fund modifications in the primary game that will increase the expected payback percentage.

The wagering game can be described in an exemplary embodiment as follows. An intermediate game outcome is first determined. An optional secondary game may be played to determine a secondary game outcome. A winning secondary game outcome results in the modification of the primary game. In this particular embodiment the intermediate game outcome is resolved based on the modification to the primary game. This determines the primary game outcome and the award for any winning game outcome. In the event the secondary game outcome is lost, or the player declines to participate in the secondary game, the primary game is not modified and the primary game is resumed—resolving the intermediate game to determine the primary game outcome.

In the above embodiment, the primary game is only modified with a winning secondary game outcome. In other embodiments even if the secondary game is a losing game outcome, the primary game may still be modified—if not to the most desired form of the primary game, to a less desirable form that still provides the player an advantage over the original primary game play.

Many different types of card games and their variations can be implemented for use in conjunction with this wagering game. These card games include, for example, and not all-inclusive: Blackjack Poker, Red Dog, and their variants. This wagering game may also include slot type games.

In one embodiment, the primary and secondary games may be the same type of games. For example, the primary and secondary games may both be Blackjack games. Alternatively, different types of card games may be used in the primary and secondary games. For example, the primary game may be a type of Poker game whereas the secondary game may be a Blackjack game.

In addition to card type games, as noted above, the primary and secondary games may also be slot type games. For example, in one embodiment, an intermediate game outcome may be a five-reel slot game displaying three of the five reels. The player may then participate in a secondary game, also a slot game, for a chance to modify the primary game to the player's advantage. In this embodiment, in the event a winning secondary game outcome is received, the primary game is modified to increase the expected payback percentage. Once the primary game is resumed, the intermediate game outcome (i.e., the three displayed reels) is resolved by displaying the outcome of the two remaining reels.

Figure 4:
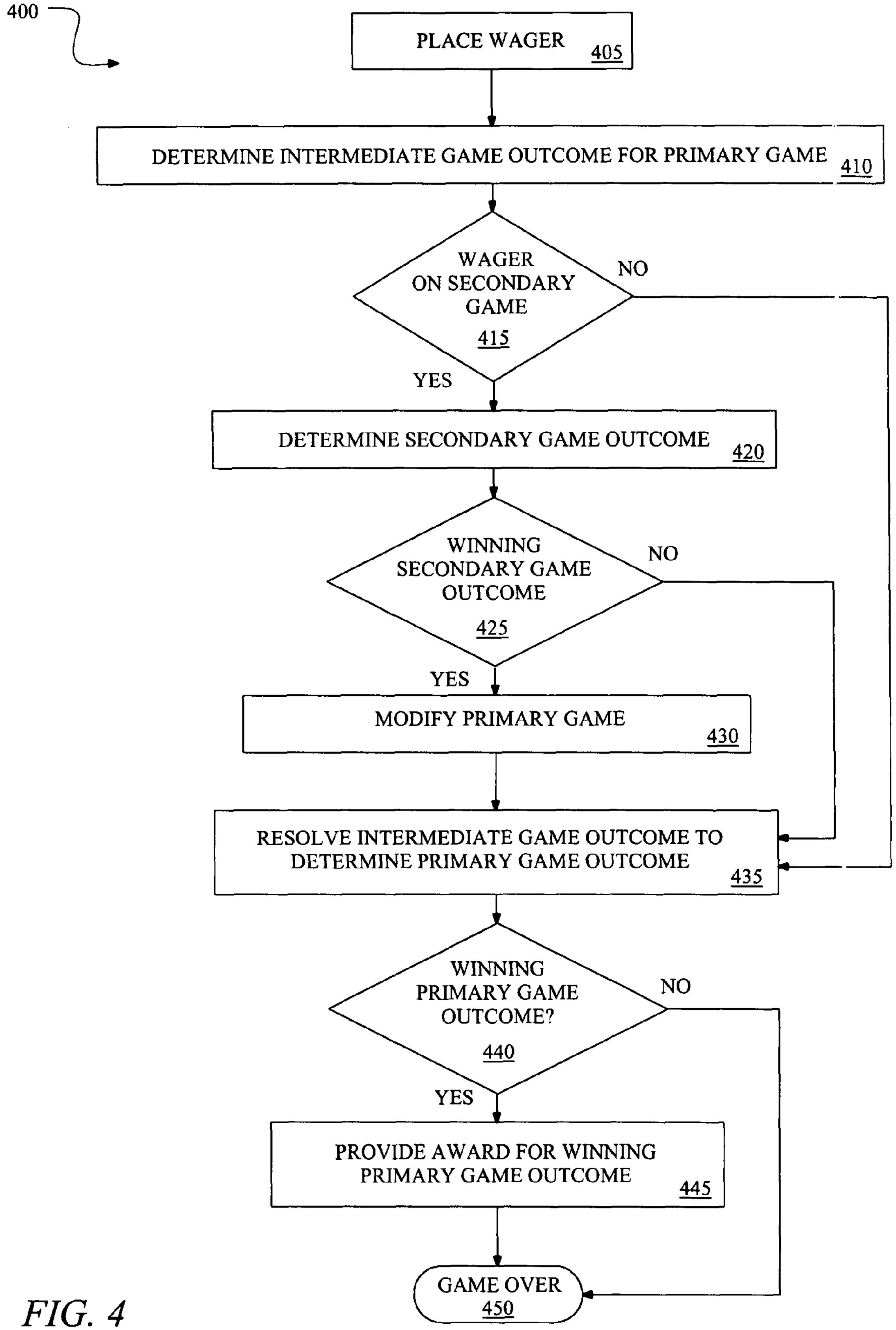
FIG. 4 is an exemplary process flowchart illustrating a first embodiment of the wagering game having a winning primary game outcome determined by a pay table.
Figure 5:
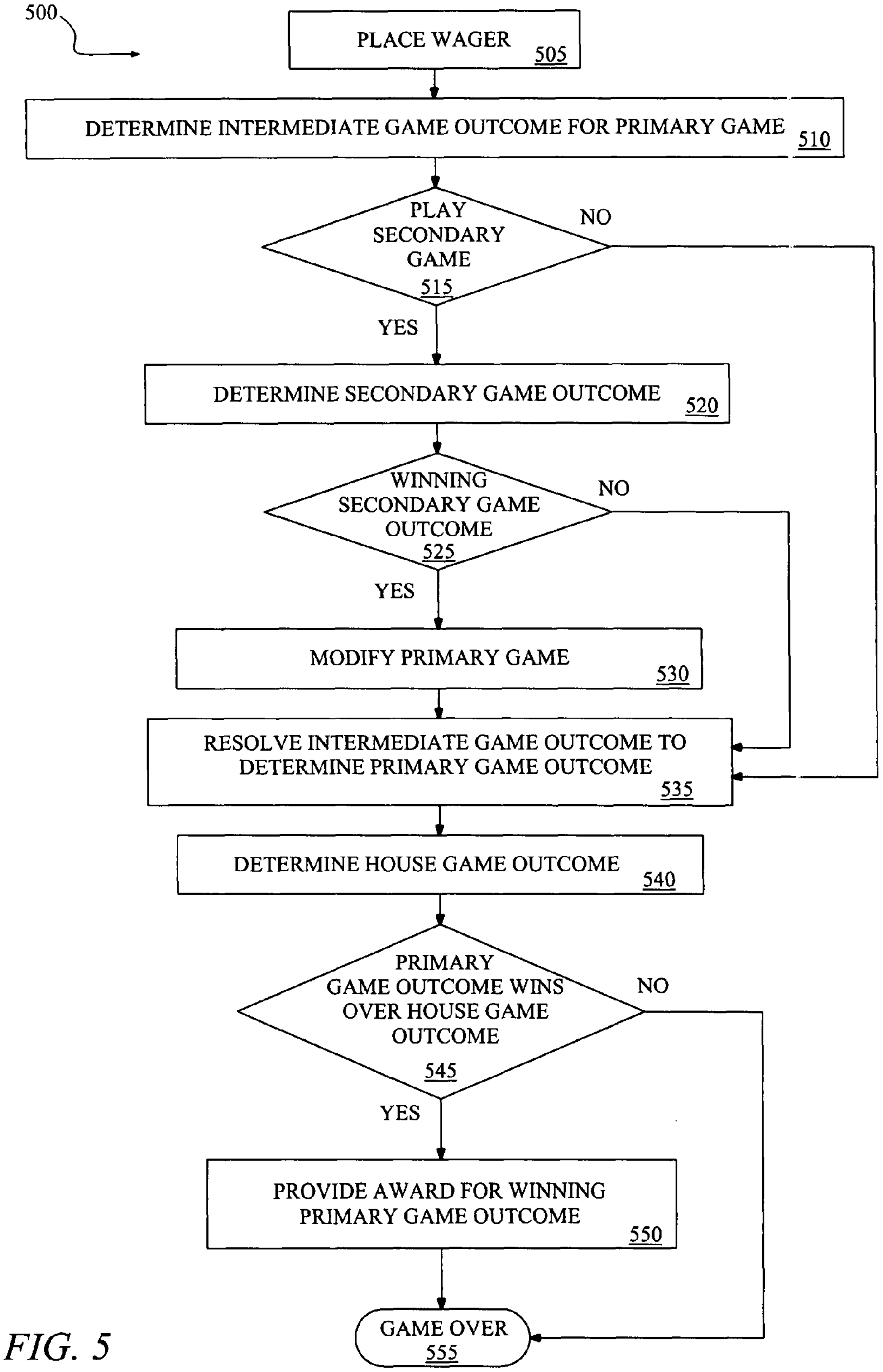
FIG. 5 is an exemplary process flowchart illustrating a second embodiment of the wagering game having a winning primary game outcome determined via a comparative evaluation with a house game outcome.

To provide an overview of the wagering game process, two different embodiments of the wagering game are illustrated in the process flowcharts of FIG. 4 and FIG. 5. The major difference between these flowcharts is the methodology for identifying a winning primary game outcome.

In the embodiment illustrated by the process flowchart of FIG. 4, a winning game outcome in the primary game is determined with a predetermined criterion. For example, a predetermined criterion for a winning game outcome can be included in a pay table. Pay tables are, in one embodiment, databases listing winning combinations of indicia and corresponding awards.

In the embodiment illustrated by the process flowchart of FIG. 5, the primary game outcome is compared to a house game outcome (that may be played either before or after the primary game outcome is determined). The house game is played for the gaming establishment against the player's primary game to determine which has the superior and winning game outcome. The house game outcome is determined by the gaming machine making game play decisions calculated to provide the highest probability of a winning game outcome.

Similar to the primary games, winning secondary game outcomes may be identified either by predetermined criteria or by comparative evaluation with a house game outcome. In the embodiments illustrated by the flowcharts of FIG. 4 and FIG. 5, winning secondary game outcomes are identified with predetermined criteria (e.g., a pay table). Using a pay table facilitates the rapid determination of the secondary game outcome; quickly returning the player back to the primary game. To further increase the speed of game play in the secondary game, in one embodiment, the secondary game outcome may be determined automatically using an auto-play feature that optimizes game play decisions. In another embodiment, both the secondary and the primary games may use the autoplay mode of the gaming machine—leaving only the wagering decisions to the player.

Turning to FIG. 4, an exemplary first embodiment process flow chart 400 for the wagering game is illustrated. The wagering process commences by placing a wager in steps 405. In response, the gaming machine determines an intermediate game outcome for the primary game in step 410. Player inspection of the intermediate game outcome determined in step 410 provides a probabilistic indication for receiving a winning primary game outcome—helpful to the player's decision to either decline or elect to wager on a secondary game in step 415.

Should the player decide not to participate in the secondary game, the outcome of the primary game is determined in step 435 using the original game play offered with the primary game to resolve the intermediate game outcome determined in step 410. Otherwise, the secondary game outcome is determined in step 420.

In step 425, the secondary game outcome is evaluated to identify a winning secondary game outcome, if any. In this embodiment, if the secondary game is a losing game outcome, the primary game outcome is then determined in accordance with the original primary game play in step 435; resolving the intermediate game outcome to determine the primary game outcome determined in step 410.

If the secondary game outcome is a winning game outcome, the primary game is modified in step 430. The primary game outcome is then determined—resolving the intermediate game outcome in accordance with the modified primary game in step 435.

The primary game outcome is evaluated to identify a winning primary game outcome in step 440. If the primary game is a winning game outcome an award is provided in step 445. If the primary game outcome is not a winning game outcome, the game is over in step 450.

Turning to FIG. 5, an exemplary second embodiment process flowchart 500 illustrates an embodiment wherein the winning primary game outcome is determined by a comparative evaluation of the primary game outcome to a house game outcome. The wagering process commences by placing a wager in step 505. In response, the gaming machine determines an intermediate game outcome for the primary game in step 510. Player inspection of the intermediate game outcome determined in step 510 provides information helpful to the player's decision to either decline or elect to wager on a secondary game in step 515.

Should the player decide not to participate in the secondary game, the outcome of the primary game is determined in step 535 using the original game play offered with the primary game to resolve the intermediate game outcome determined in step 510. Otherwise, the secondary game outcome is determined in step 520.

In step 525, the secondary game outcome is evaluated to identify a winning game outcome, if any. If the secondary game is a losing game outcome, the primary game outcome is then determined in accordance with the original game play offered with the primary game in step 535—resolving the intermediate game outcome determined in step 510 to determine a primary game outcome.

If the secondary game outcome is a winning game outcome, the primary game is modified in step 530. The primary game outcome is determined in step 535 with the resolving of the intermediate game outcome determined in step 510 in accordance with the modified primary game.

In step 540, a house game outcome is determined. The house game outcome, in one embodiment, is determined by the gaming machine using optimum game play strategies. The house game, in one embodiment, is the same as the primary game and has the same original game play as the primary game.

The house game outcome is comparatively evaluated against the primary game outcome to identify which of the two is the winning game outcome in step 545. If the primary game is a winning game outcome an award is provided in step 550. If the primary game outcome is not a winning game outcome, the game is over in step 555.

Although the game may be played with a single primary game, in other embodiments, a plurality of primary games may be played simultaneously in conjunction with a single secondary game. In such an embodiment, the plurality of primary games may comprise indicia randomly selected from a single indicia set or from separate indicia sets. Any advantages/benefits (i.e., from a change in game play) accrued from the secondary game may be applied to all the primary games, or in another embodiment, selectively conferred to specific primary games.

The secondary game may be available, in one embodiment, only after the first intermediate game outcome is displayed to the player and prior to a display of any further intermediate game outcomes, if any. In another embodiment, the secondary game is still selectively available to the player even after a plurality of intermediate game outcomes have been displayed, but prior to the determination of the primary game outcome.

In one embodiment, the player may be required to make an additional wager to play the secondary game. In another embodiment, participation in the secondary game may be automatic with the initial wager on the primary game. In still another embodiment, a decision to decline participation in the secondary game allows the player to withdraw a portion of the initial wager made on the primary game.

In addition to modifying the play of the primary game, a winning secondary game outcome, in one embodiment, may payout (i.e., credits) for a winning secondary game outcome. This secondary game payout may be in accordance with a pay table, have a fixed rate payout, or any other payout methodology. For example, the player either loses the secondary game wager or receives double the wager back in return for a winning secondary game outcome. Alternatively, in another embodiment, a pay table may be used with escalating pay offs for increasingly less probable winning game outcomes. For example, a secondary game outcome having a Blackjack of the same suit may payoff at triple the rate of a Blackjack having different suits.

In one embodiment, the modified primary game creates an advantage and/or benefit for the player. A change in game play could increase the probability of a winning primary game outcome and/or increase the awards available for a winning primary game outcome. This change in game play could alter the game play rules to incorporate new game play mechanics (i.e., features, strategies, tactics, etc.) into the primary game.

For example, a change in game play that increases the probability of obtaining a winning primary game outcome is to alter the "push" game (i.e., tie game) rules that have traditionally entitled players to the return of their wager amount in the event of a tie game. For example, in one embodiment, a player, rather than breaking even in a push game, wins the game and is entitled to an award.

Another example of a change in game play that increases the probability of a winning primary game outcome is to alter the pay table for the primary game in response to a winning secondary game outcome. The modified pay table may include additional winning game outcomes not available under the rules of the original primary game, thereby increasing the probability that the player will obtain a winning primary game outcome.

In other embodiments, a change in game play in the primary game may affect the potential award available for a winning primary game outcome. For example, the benefit accrued for a winning secondary game outcome may be a multiplier (e.g., a 3× multiplier) applied to any primary game award. A player who either lost the secondary game or did not make the wager to participate in a secondary game, would only receive the standard award for a winning primary game outcome—and not benefit from the multiplier. In this embodiment, the probability of obtaining a winning primary game outcome is the same, yet if the primary game is won, a larger payout could be obtained—increasing the payback percentage of the primary game from its original unmodified form.

Another example of a Blackjack game play mechanic that potentially increases the award for a winning primary game outcome includes a feature commonly known as "double down". Traditionally this game play mechanic required the player to accept one and only one additional card to the player's card hand.

In this embodiment, double down allows the player to increase the initial wager (to double the player's wager) on a primary game after the display of an intermediate game outcome. For example, in this embodiment, a player may double down on a primary game if the secondary game has a winning game outcome. If the player has received a winning secondary game outcome, an additional wager may be placed on the primary game prior to the determination of the primary game outcome. In a variation of the more traditional double down feature, in one embodiment, the player may receive any number of additional cards to the primary card hand.

The surrender function is another traditional Blackjack game play mechanic. The surrender function allows the player to end the game prior to the determination of a final game outcome with the forfeiture of a portion of the wager amount (typically half). In one embodiment, with a winning secondary game outcome, the player may, at their discretion, withdraw from the primary game prior to the determination of the primary game outcome.

In the embodiments discussed above, changes in game play have generally resulted in the accrual of one specific advantage in the primary game. For example, in one embodiment, the double down advantage is the only available advantage for a winning secondary game outcome. However, multiple advantages and/or benefits may be accrued to the primary game from a single winning secondary game outcome. For example, in another embodiment, a winning secondary game outcome may allow the primary game to accrue both the double down and the surrender advantage.

In another embodiment, modifications to primary game play may be selected by the player from a plurality of advantages and/or benefits. Alternatively, the gaming machine may randomly select modifications to the primary game from a plurality of possible modifications.

The indicia used to form the primary, secondary, and house games may, in one embodiment, be randomly selected from a single indicia set, such as a card from a virtual card deck. In some embodiments, indicia are selected from an indicia set having a plurality of card decks. In still other embodiments, the indicia set may comprise a continuously replenished indicia set.

For example, in the embodiment noted above, the indicia obtained for the primary, secondary, and house games may be from a single indicia set. However to make card counting more difficult, the secondary game may be formed from indicia selected from a separate indicia set than that used by the primary and house games. In still another embodiment, the primary, secondary, and house games may all be selected from different indicia sets.

FIG. 6 illustrates the progressive development of an exemplary embodiment of the wagering game in a series of illustrations (FIGS. 6A-6D). The primary and secondary games are both Blackjack games in this embodiment. In this particular embodiment, a winning secondary game outcome allows the player to double down in the primary games.

Figure 6A:
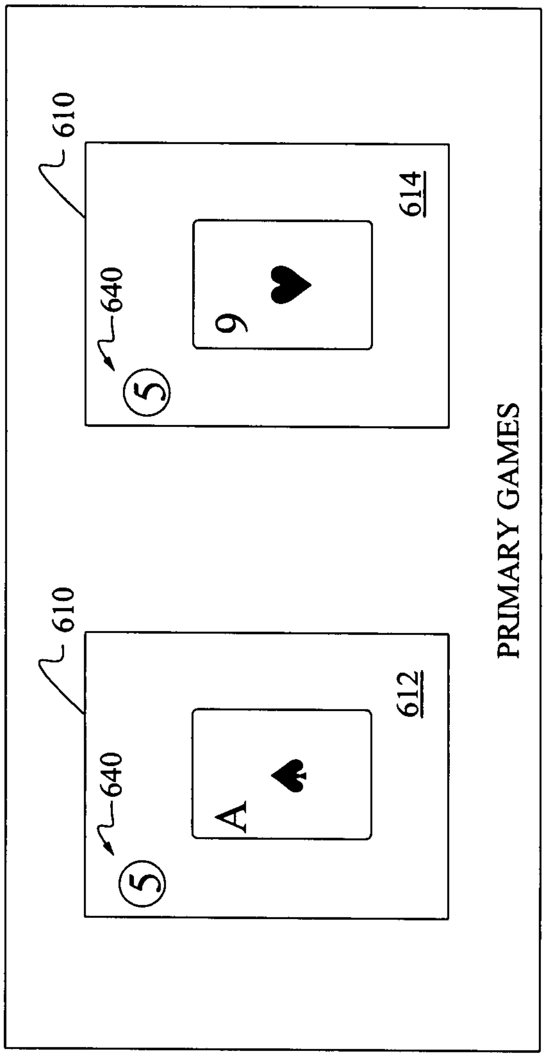
FIG. 6A is an exemplary intermediate game outcome illustrating the game play development of an embodiment of the wagering game.

Referring to FIG. 6A, two exemplary individual primary games 610 are illustrated with intermediate game outcomes 612 and 614. The first intermediate game outcome 612 indicates that the player has received the Ace of Spades, and the second intermediate game outcome 614 has received the Nine of Hearts. This makes the double down benefit particularly attractive because of the inherent high probability of either receiving a card having a numeric value of 10 or an Ace (having a numeric value of 11 or 1). Because of the high probability of receiving a numeric value of 10 or 11 in both primary games 610, it is likely that the player will receive a numeric score very close to 21 (without the possibility of exceeding 21 and becoming disqualified from the game).

Figure 6B:
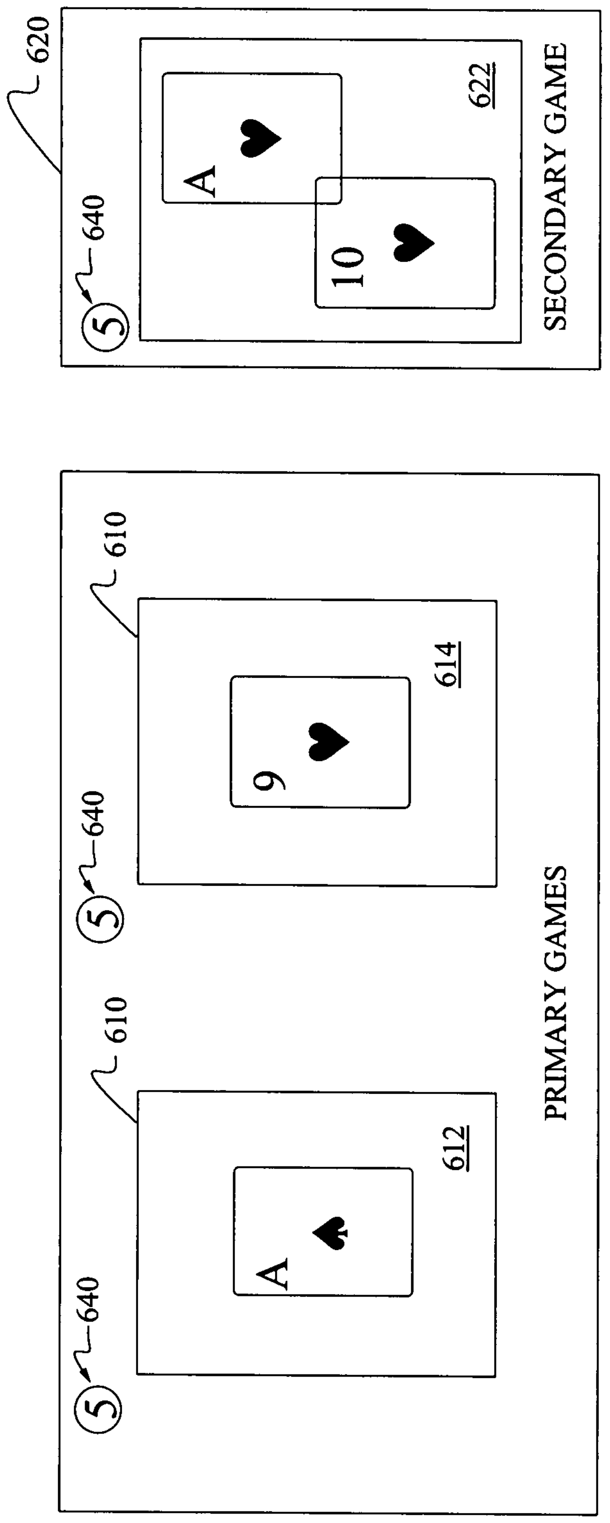
FIG. 6B is an exemplary secondary game outcome illustrating the further development of the game play illustrated in FIG. 6A.

Referring to FIG. 6B, the player has elected to wager 640 on the secondary game 620 with the hope of receiving the double down benefit. An exemplary secondary game outcome 622 is illustrated having a same suit Blackjack (Ace of Hearts and Ten of Hearts). The intermediate game outcomes 612 and 614 are also illustrated as in FIG. 6A.

In this embodiment, the secondary game 620 is evaluated against a pay table to determine a winning game outcome. The pay table for the secondary game in this embodiment provides for a payout for a winning secondary game outcome. In this embodiment, the payout for a winning secondary game outcome is a fixed 1 for 1 payback for any winning secondary game outcome.

The pay table provides a winning secondary game outcome with a score of 18 or better—but less than or equal to 21. Consequently, the player has won the double down benefit/advantage for both the primary games 610. With the double down benefit conferred to the primary games 610, the player has elected to increase the wager 640 (i.e., double down) on each of the primary games as illustrated in FIG. 6C.

Figure 6C:
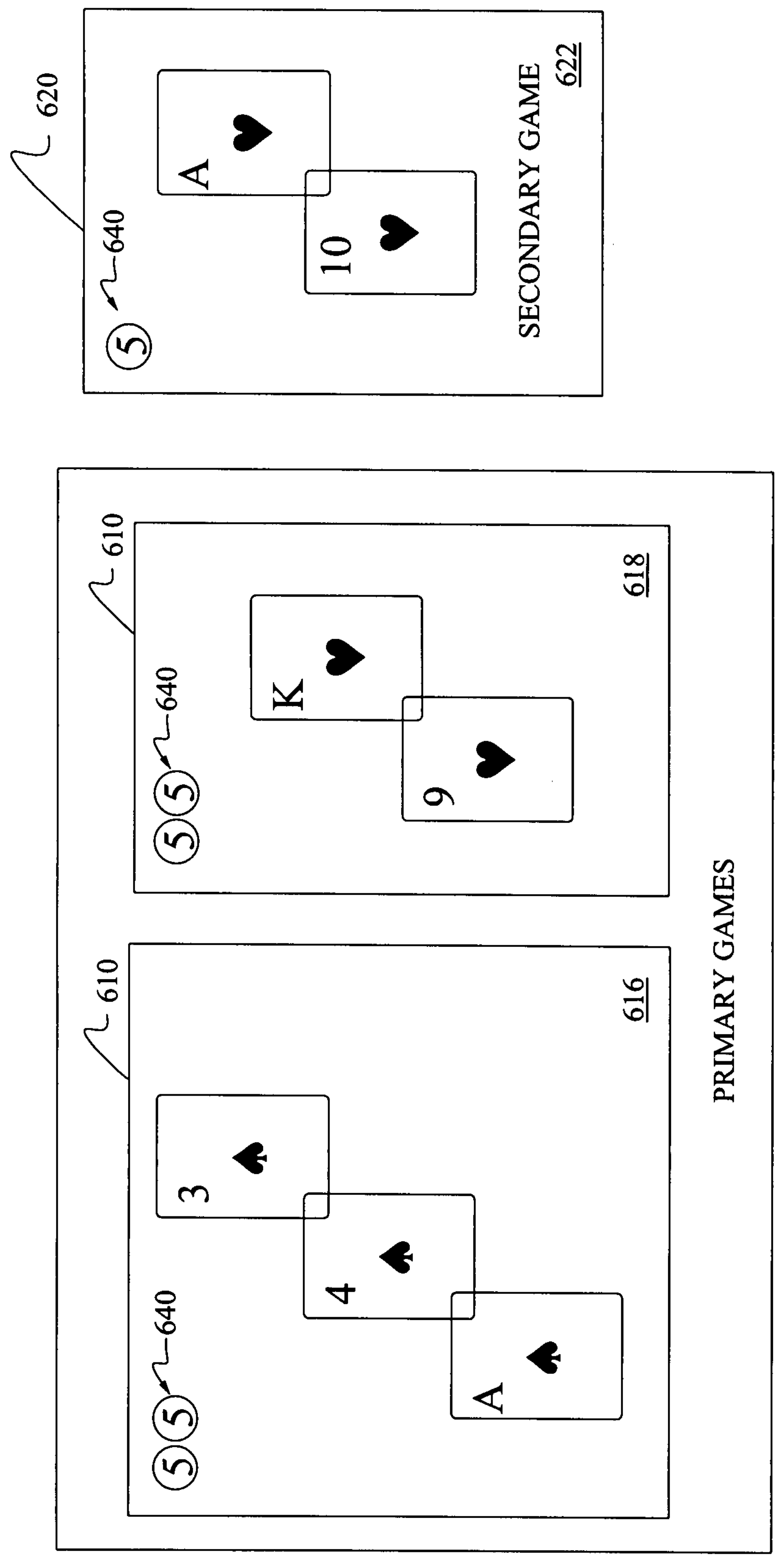
FIG. 6C is an exemplary primary game outcome illustrating the further development of the game play illustrated in FIG. 6B.

Referring to FIG. 6C, two exemplary primary game outcomes 616 and 618 are illustrated for the primary games 610. One primary game outcome 616 comprising the Ace of Spades, Four of Spades, and Three of Spades has a numerical score of 18. The other primary game outcome 618 comprising the Nine of Hearts and King of Hearts has a numerical score of 19.

Figure 6D:
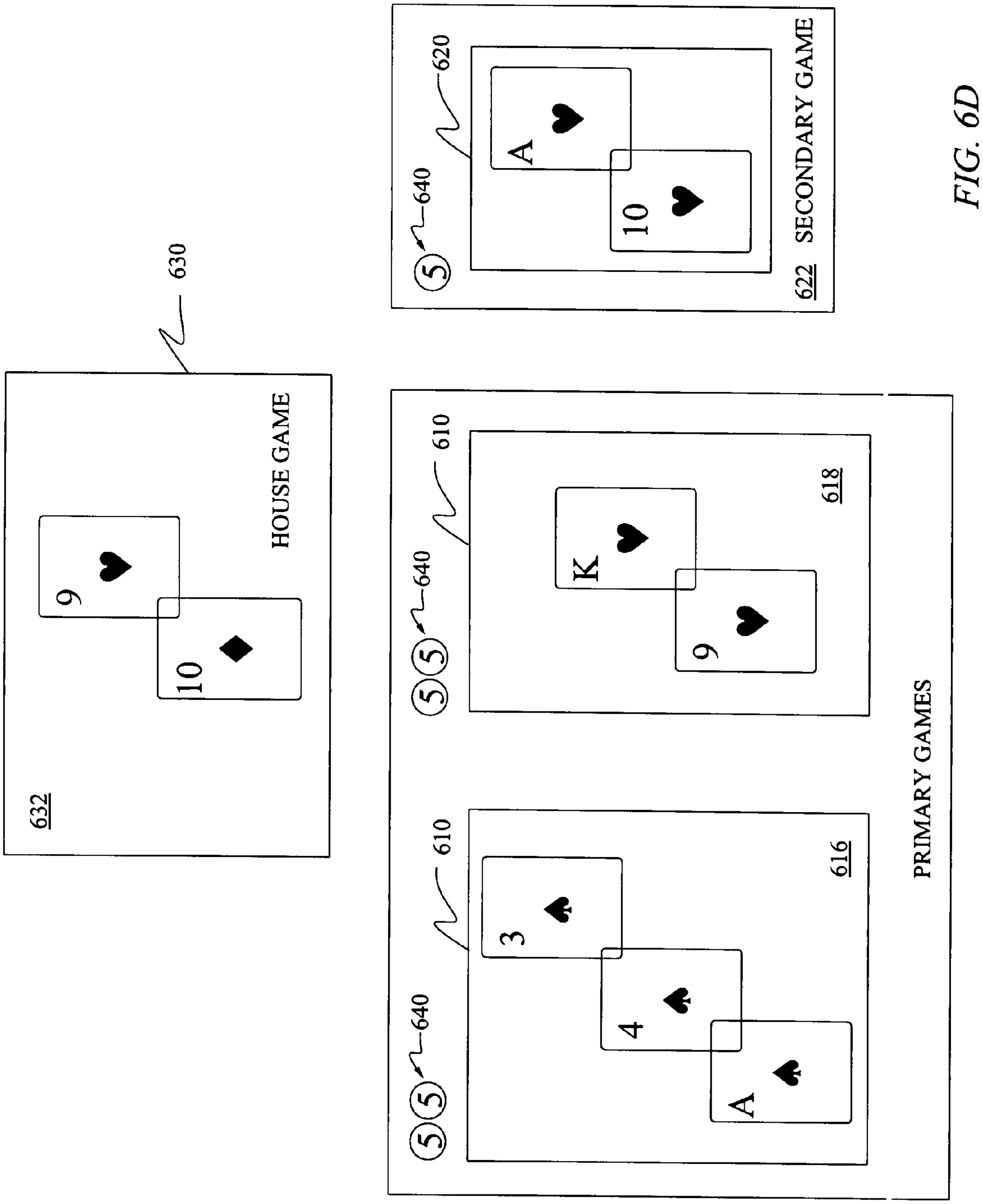
FIG. 6D is an exemplary house game outcome illustrating the further development of the game play illustrated in FIG. 6C.

Referring to FIG. 6D, an exemplary house game 630 is illustrated. The house game outcome 632 comprises the Nine of Hearts and Ten of Diamonds forming a numerical score of 19.

The house game outcome 632 is compared to each of the primary game outcomes 616, 618 to identify winning primary game outcomes. In this exemplary embodiment, the primary game outcome 616 has a numerical score of 18 and loses against the house game outcome 632 having a numerical score of 19. The primary game outcome 618 has a numerical score of 19 and results in a “push” with the house game outcome 632 (also having a numerical score of 19).

Consequently, the player has lost the wager on primary game outcome 616, and the player’s wager is returned on the primary game outcome 618. In addition, the player has won the wager on the secondary game 620. Consequently, the player has a net loss of five credits on the game (ten credit loss on primary game outcome 616, breakeven on primary game outcome 618, and a five credit win on secondary game 620).

In another embodiment of this exemplary game, the benefit potentially accrued for a winning secondary game outcome could include both the double down benefit as well as determining a push (i.e., tie game) in favor and to the benefit of the player. In such an embodiment, for the wagering game outcome shown in FIG. 6D, the player would have a net win of five credits (10 credit loss on primary game outcome 616, ten credit win on primary game outcome 618, and a five credit win on secondary game 620).

While the invention has been illustrated with respect to several specific embodiments, these embodiments are illustrative rather than limiting. Various modifications and additions could be made to each of these embodiments as will be apparent to those skilled in the art. Accordingly, the invention should not be limited by the above description or of the specific embodiments provided as examples. Rather, the invention should be defined only by the following claims.

The invention claimed is:

1. A method of playing a wagering game with a gaming machine, the gaming machine having a central processing unit for executing the wagering game, wherein the central processing unit controls a display, a wager acceptor, and a payout mechanism, comprising:
- receiving a first wager with the wager acceptor to receive a primary game;
- determining an intermediate game outcome for the primary game, the intermediate game outcome presented on the display, wherein the intermediate game outcome provides an indication of a probability for a winning primary game outcome;
- in response to the intermediate game outcome, receiving a selection wherein the selection is one of either:
  - resolving the intermediate game outcome to determine a primary game outcome; or
  - receiving a secondary game in response to a second wager;
- if upon receiving the selection for the secondary game:
  - determining a secondary game outcome for the secondary game, wherein a winning secondary game outcome causes a modification of the primary game to increase the probability of receiving the winning primary game outcome from the intermediate game outcome; and
  - in response to receiving the secondary game outcome, resolving the intermediate game outcome to determine the primary game outcome; and
- providing an award for the winning primary game outcome with the payout mechanism.

2. The method of claim 1, further including providing another award for the winning secondary game outcome with the payout mechanism.

3. A method of playing a wagering game with a gaming machine, the gaming machine having a central processing unit for executing the wagering game, wherein the central processing unit controls a display, a wager acceptor, and a payout mechanism, comprising:
- receiving a first wager with the wager acceptor to receive a primary game;
- determining an intermediate game outcome for the primary game, the intermediate game outcome presented on the display, wherein the intermediate game outcome provides an indication of a probability for a winning primary game outcome;
- in response to determining the intermediate game outcome, receiving a selection wherein the selection is one of either:
  - resolving the intermediate game outcome to determine a primary game outcome; or
  - receiving a secondary game in response to a second wager;
- if upon receiving the selection for the secondary game:
  - determining a house game outcome;

determining a secondary game outcome for the secondary game;

identifying either a winning secondary game outcome or a winning house game outcome, wherein identifying the winning secondary game outcome causes a modification of the primary game to increase the probability of receiving the winning primary game outcome from the intermediate game outcome; and resolving the intermediate game outcome to determine the primary game outcome; and providing an award for the winning primary game outcome with the payout mechanism.

4. The method of claim 3, further including providing another award for the winning secondary game outcome with the payout mechanism.

5. A gaming machine for playing a wagering game, comprising:

a wager acceptor for recognizing a first wager;

a video display for displaying the wagering game;

a central processing unit configured for executing a program to:

determine an intermediate game outcome for a primary game, wherein the intermediate game outcome provides an indication of a probability of a winning primary game outcome;

receive a selection in response to the intermediate game outcome to either:

determine a primary game outcome from the intermediate game outcome; or receive a secondary game in response to a second wager recognized with the wager acceptor;

if the second wager is recognized:

determine a secondary game outcome for the secondary game, wherein a winning secondary game outcome causes a modification of the primary game to increase the probability of receiving the winning primary game outcome from the intermediate game outcome; and in response to the secondary game outcome, determine the primary game outcome from the intermediate game outcome; and a payout mechanism for providing an award for the winning primary game outcome.

6. The gaming machine of claim 5, wherein the payout mechanism provides another award for the winning secondary game outcome.

* * * * *